June 24, 1930.  W. SCHRODER  1,768,495
MACHINE TOOL STOP MECHANISM
Filed March 3, 1926   3 Sheets-Sheet 2

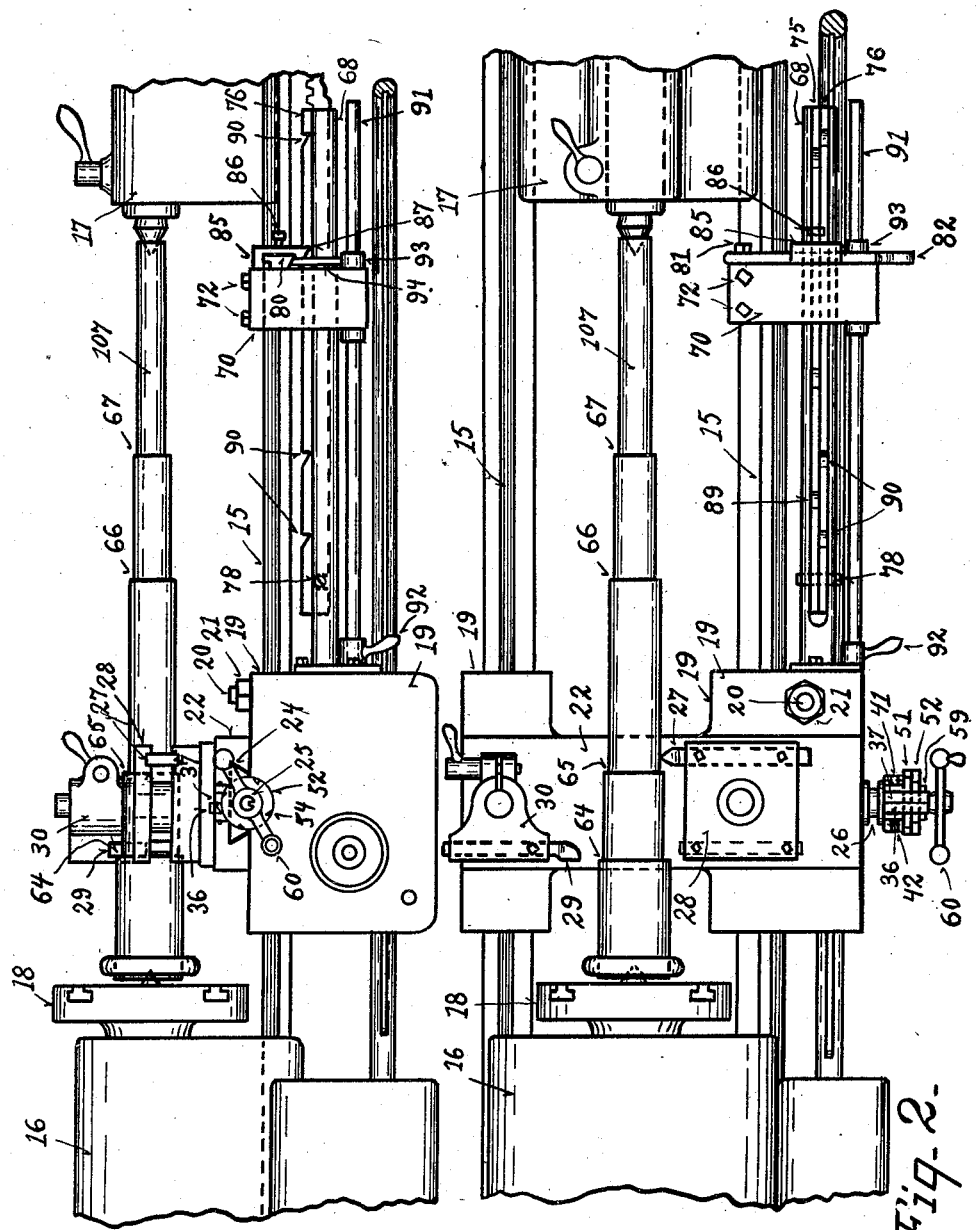

Inventor,
William Schroder,
By C. W. Miles,
Attorney.

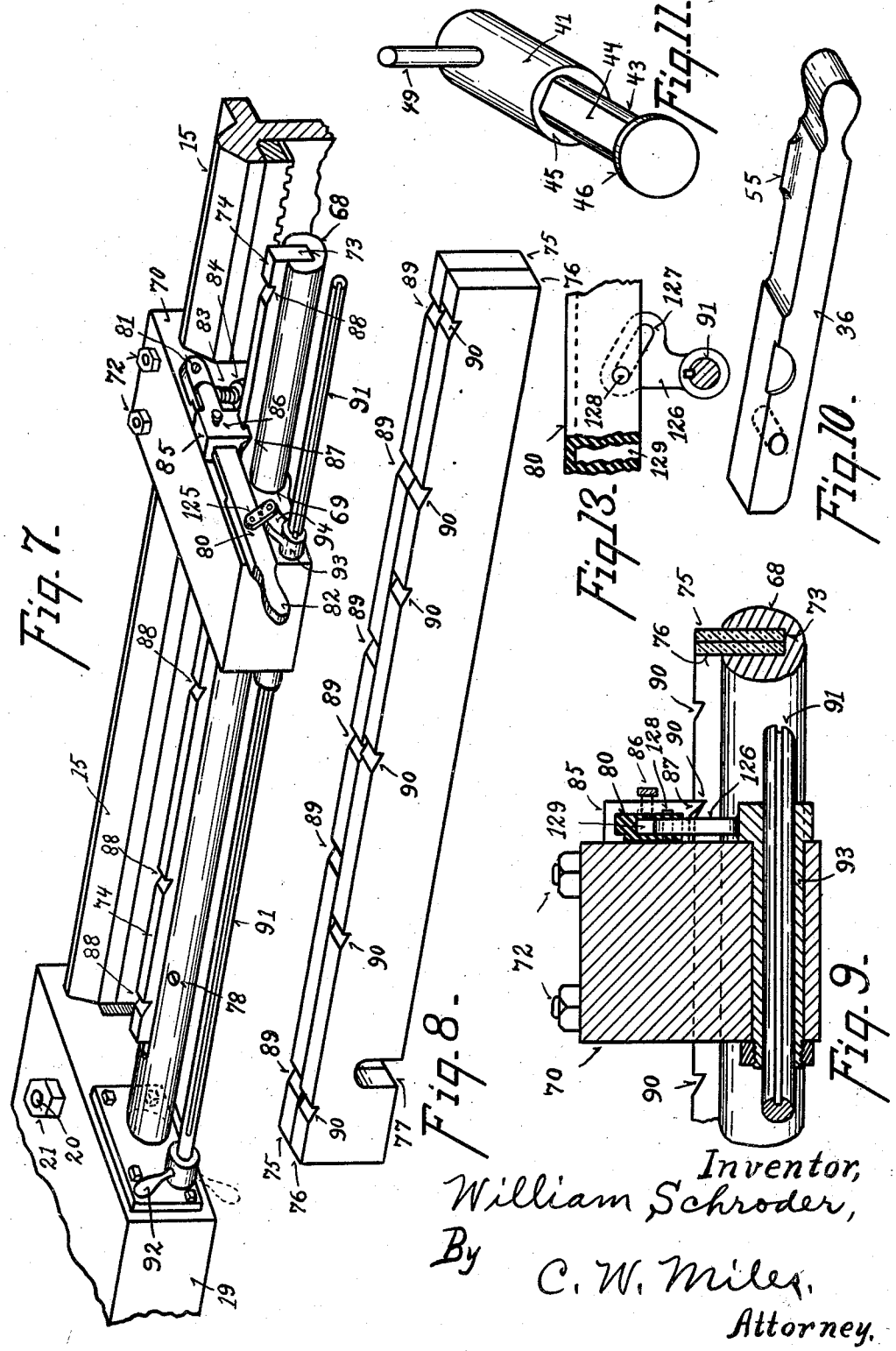

Patented June 24, 1930

1,768,495

UNITED STATES PATENT OFFICE

WILLIAM SCHRODER, OF COVINGTON, KENTUCKY, ASSIGNOR TO THE SEBASTIAN LATHE COMPANY, OF CINCINNATI, OHIO, A CORPORATION OF OHIO

MACHINE-TOOL-STOP MECHANISM

Application filed March 3, 1926. Serial No. 92,082.

My invention relates to improvements in stop mechanism for lathes and other machine tools. One of its objects is to provide improved tool carriage, cross-feed stop mechanism. Another object is to provide improved tool carriage longitudinal feed stop mechanism. Another object is to provide improved stop feed mechanism, whereby a series of work, or stock, members may be successively dressed at different sections to duplicate dimensions, and whereby the shoulders separating such stock member sections may be accurately dressed and spaced to uniform dimensions. Another object is to provide improved longitudinal stop feed mechanism adapted to be set for relatively short as well as long spacing. Another object is to provide improved stop feed mechanism adapted to stop a tool carriage provided with a plurality of tools to independently position the respective tools as to their cross-feed. Another object is to provide stop feed mechanism adapted to stop a tool carriage provided with a plurality of tools to independently position the respective tools as to their longitudinal feed. Another object is to provide improved stop feed mechanism adapted to stop a tool carriage provided with a plurality of tools to independently position the respective tools as to their cross-feed, and also as to their longitudinal feed. My invention also comprises certain details of form and arrangement, and combination of components, all of which will be fully set forth in the description of the accompanying drawings in which:

Fig. 1 is a front elevation of a portion of a lathe embodying my improved stop mechanism.

Fig. 2 is a plan of the same.

Fig. 7 is a perspective view of a portion of the lathe bed tool-carriage and longitudinal stop mechanism shown in Figs. 1 and 2.

Fig. 8 is a perspective view of a pair of the longitudinal stop bars detached, and illustrating a modification of the stop bar shown in Figs. 1, 2 and 7.

Fig. 9 is a sectional detail through a portion of the longitudinal stop mechanism shown in Fig. 7.

Fig. 10 is a perspective view of one of the cross-feed stop bars detached.

Fig. 11 is a perspective view of one of the cross-feed stop bar adjusting members detached.

Fig. 13 is a detail partly in section showing a modification.

Figure 5:
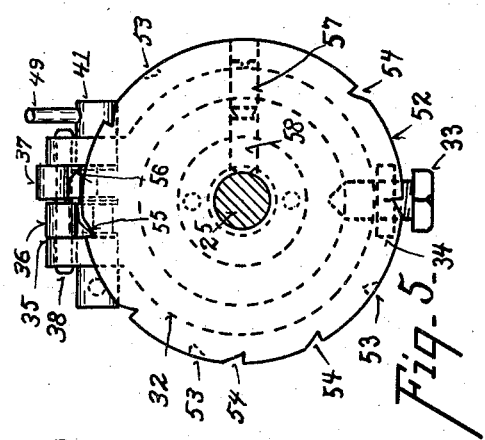
Fig. 5 is a vertical section taken on line 5—5 of Fig. 3.
Figure 6:
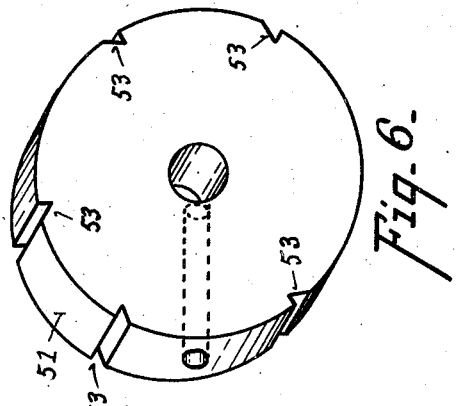
Fig. 6 is a perspective view of one of the cross-feed stop disks detached.

The accompanying drawings illustrate the preferred embodiments of my invention in which 15 represents the lathe ways or lathe bed; 16 the lathe headstock, and 17 the tailstock, and 18 the chuck. A main tool carriage 19 is mounted upon the lathe ways intermediate of the head-stock and tail-stock, and is adapted to be fed longitudinally of the ways 15, either by hand feed or by power feed in the customary manner. A clamping bolt 20 and nut 21 enable the tool carriage to be rigidly clamped to the lathe ways when desired. A slide or cross feed tool carriage, 22, is mounted upon guides 24 carried by the main tool carriage to travel transversely of the lathe ways upon and relative to the main tool carriage. A cross feed screw 25 is journaled in a sleeve 26 rigidly mounted upon the main tool carriage. The cross feed screw is preferably adapted to be optionally driven by hand or by power in either direction in customary manner. The screw 25 engages a nut attached to the cross-feed tool carriage by means of which the cross-feed tool carriage is fed transversely of the lathe ways in either direction. A single tool 27, and tool holder 28 may be adjustably mounted upon the cross-feed tool carriage, if desired, but I preferably provide a second tool 29, and tool holder 30 therefor, also detachably mounted upon the cross-feed tool carriage 22.

My improved apparatus is designed to be applied to stop the tool or tools at predetermined positions of the cross-feed and also predetermined positions of the longitudinal feed of the tools, to thereby enable a relatively large number of pieces of work or stock 107 to be successively produced of duplicate dimensions.

To control and predetermine the series of cross-feed positions or stops of the tools, I provide a collar 32 which is rigidly clamped in position upon the sleeve 26, as for instance by means of a set screw 33, and lock nut 34. The collar 32 has a channel 35 in which are mounted a pair of stop pawls 36 and 37. The pawls 36 and 37 are pivotally mounted upon a pin 38 relative to the collar 32, and have each a limited rocking movement independently of the other, whereby one or other of said pawls may be shifted from the active or operative position to an idle or imperative position. Springs 39 and 40 seated in recesses in the sleeve 32 bear yieldingly upon the rear ends of the pawls 36 and 37 respectively, tending to hold said pawls yieldingly in operative position. A pair of rock shafts 41 and 42, see Fig. 11, each provided with an eccentric portion of reduced cross section 43 having a flattened portion 44, and shoulders 45 and 46 between which the respective pawls 36 and 37 engage, are mounted end to end in a recess 47 in the sleeve 32. Each of the rock-shafts 41 and 42 is provided with an actuating lever 49 by means of which it may be rocked nearly one half of a revolution. At one extreme of the rocking movement of the members 41 and 42, the eccentric portion thereof is out of engagement with the under face of its adjacent pawl 36 or 37, while at the opposite extreme of said rocking movement the eccentric portion 43 serves to lift the pawl 36 or 37 out of its operative position into an idle position and at the same time the flattened section 44 engages the under face of the pawl 36 or 37 to retain the locking member and pawl locked in idle position until the rocking member is manually operated to release the pawl from its idle position.

The cross-feed screw 25 is locked to its sleeve 26 against movement endwise relative to said sleeve by means of a collar 48 seated in a recess in the end of the sleeve 26 and locked to rotate with the cross-feed screw, by means of a short key 49. A lock-nut 50 is threaded to the cross-feed screw outside of the collar 48, being adapted to be adjusted thereon by means of a spanner wrench entering recesses in the outer face of the nut 50. Outside of the nut 50 is a cylindrical section of the cross-feed screw upon which are mounted preferably two disks or collars 51 and 52 which are respectively provided with a plurality of stop slots or recesses 53, and 54, said stop recesses 53 on the collar 51, being faced in the opposite direction to the recesses 54 on the collar 52. When the collars 51 and 52 are originally placed upon the end of the cross-feed screw they are adjusted rotatably thereon by hand until the respective recesses 53 and 54 are in the desired position with reference to the cross-feed screw to stop the cross-feed of the respective tools at the desired positions when said recesses 53 and 54 are respectively or alternately engaged by the pawl tooth 55 of the pawl 36 or by the pawl tooth 56 of the pawl 37, depending upon which pawl 36 or 37 is adjusted to operative position. After the collars 51 and 52 have been originally adjusted to position upon the end of the cross-feed screw they are temporarily held in place by means of set screws 57 which in turn engage soft metal plugs 58, which engage the face of the end of the cross-feed screw without danger of injuring the same. After the collars 51 and 52 have been adjusted by hand to correct position, they are firmly and reliably clamped together, and to the end of the cross-feed screw by means of a nut 59 threaded to the end of the cross-feed screw outside of the collars 51 and 52.

A hand wheel 60 is slipped loosely and detachably upon the end of the cross-feed screw outside of the nut 59, and is keyed to the cross-feed screw to enable the cross-feed screw to be actuated manually, which is the usual practice. If desired however, the cross-feed screw may be provided with a gear and be driven thereby by power from a train of gears in the tool carriage apron, in a customary manner of driving the cross-feed screw.

One of the collars, for instance the collar 52 is provided with a series of stop recesses 54 to be successively engaged by the tooth 55 of the pawl 36 to enable the tool 27 to be successively set accurately to predetermined positions in order to cut the work therewith to predetermined depths at different sections of its length. The other collar, for instance collar 51, by means of the series of stop recesses 53 to be successively engaged by the tooth 56 of the pawl 37, provides for successively adjusting and setting the tool 29 accurately to predetermined positions in order to cut the work therewith to predetermined depths at different sections of its length. A large number of duplicate work members may thus be machined, one after another accurately to uniform diameters using one set of collars 51 and 52. The respective collars 51 and 52 are readily detachable and replacable with other similar collars in sets, but provided with differently spaced stop recesses. The relative cross-feed movements of the tools upon the tool carriage as compared with the movements of the periphery of the collars 51 and 52 beneath the pawl teeth 55 and 56 is very small, for instance, something like one thousandth of an inch of tool movement to each one fourth of an inch movement of the periphery of the collars 51 and 52 relative to one of the projections or teeth 55 and 56, thereby providing or accuracy in the dimensions of successive work members. The cross-feed screw may be fed several revolutions between successive engagements of the pawl 36 or 37 with successive stop recesses of a collar 51 or 52.

In order that the shoulders 64, 65, 66 and 67 of the respective or successive work pieces may be accurately spaced at predetermined distances apart, I provide stop mechanism adapted to be employed to stop the longitudinal feed of the tool carriage successively for each work piece at predetermined positions. This longitudinal stop mechanism comprises a supporting bar 68 attached to one end of the tool carriage 19 and movable therewith along the lathe bed. The free end of the bar 68 passes through a recess 69 in a block or carriage 70 which is mounted to move endwise along the lathe bed, and is adapted to be rigidly clamped to the lathe bed by means of clamping bolts 72. The recess 69 serves to support and guide the free end of the bar 68. The bar 68 has a longitudinal recess 73 which serves to detachably and interchangeably receive and support a series of stop bars. In Fig. 7 I have illustrated the use of a single stop bar 74, while in Figs. 1 and 8 I have illustrated two stop bars 75 and 76 arranged side by side, and adapted to be jointly employed interchangeably with the bar 74. A separate stop bar or set of stop bars is designed to be employed for each type of work member to be turned out in duplicate. The stop bars 74, 75 and 76 are each provided on their lower edge with a notch or recess 77 to engage over a cross bolt 78 which spans the recess in the bar 68 in which the stop bars seat to hold the stop bars longitudinally in place. A latch bar 80 is pivotally attached to one side face of the carriage 70 at 81, and at its free end is provided with a hand lever 82. A coiled spring 83 seated upon a projection 84 extending from the carriage 70 engages the under face of the latch bar 80 to normally hold said latch bar in an elevated or inoperative position. A slide or carriage 85 is mounted upon the latch bar 80 to have a limited sliding movement endwise of the latch bar 80, and is preferably locked by means of a spring actuated latch member 86 to a series of predetermined positions relative to the latch bar 80. The slide 85 is provided along its lower edge with a tooth 87 adapted to engage any one of a series of notches 88 in the upper face of the stop-bar 74, and also by adjusting the slide 85 endwise of the latch bar 80, to enable one end of the tooth 87 to engage any one of the notches 89 of the stop bar 75, and the opposite end of the tooth 87 to engage any one of the notches 90 of the stop bar 76. Where the shoulders 64, 65, 66 and 67 of the work members are spaced considerable distances apart, a single bar 74 with notches 88 across its entire face is adapted to be employed. Where however the spaces between the shoulders 64, 65, 66 and 67 of the work are relatively short, I preferably employ a plurality of bars 75 and 76 and adjust the slide 85 upon the latch bar 80 to enable opposite ends of the tooth 87 to selectively engage the notches 89 and 90, and thereby space the work member shoulders close together. In order that the latch bar may be lifted out of engagement with the spacing bars 74, 75, 76 and 77 from a position of the operator in front of the tool carriage, I provide a splined shaft 91 attached and journaled at one end to the end of the tool carriage and provided with a hand lever 92 by means of which said shaft 91 may be rocked. The free end of shaft 91 is mounted in and keyed to a sleeve 93 which is journaled to the carriage 70. The sleeve 93 is provided with a crank arm 94 connected by a link 125 with the latch bar 80 to lift the latch bar, see Fig. 7, and thereby disengage the tooth 87 from engagement with any one of the notches 88, 89 and 90.

Figures 3, 4:
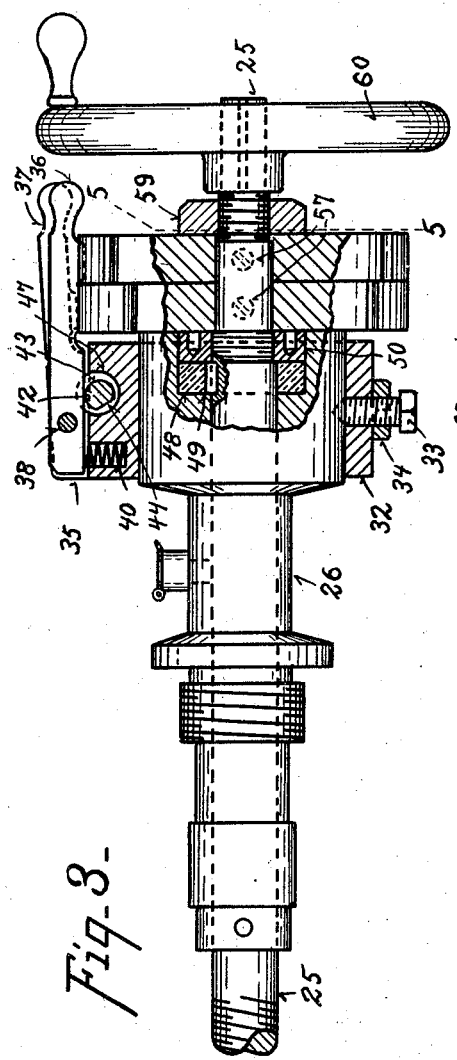
Fig. 3 is a detail partly in side elevator and partly in section on line 3—3 of Fig. 4 of the forward portion of the tool carriage cross-feed screw with a portion of my improved apparatus applied thereto.
Fig. 4 is a plan of the parts shown in Fig. 3.
Figure 12:
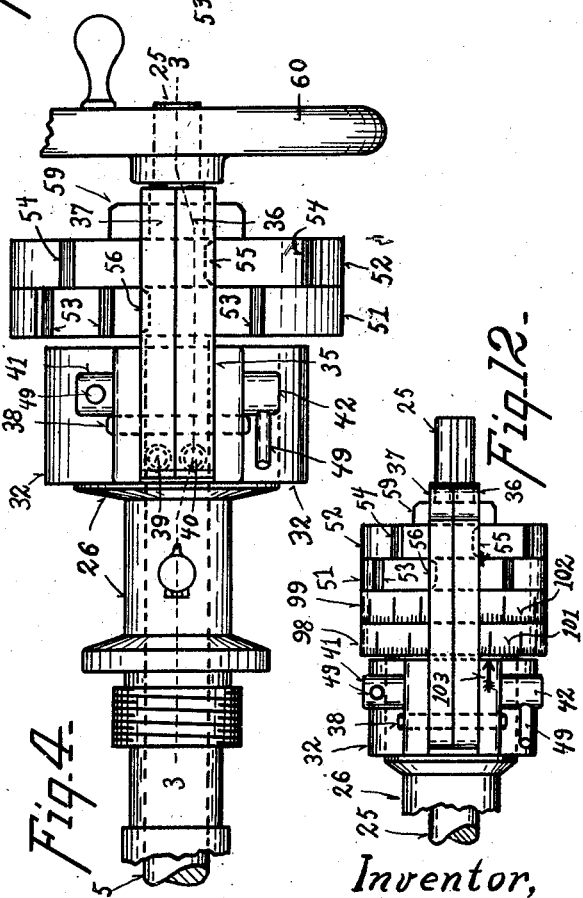
Fig. 12 is a view similar to Fig. 4 illustrating a modification.

In Fig. 12 I have illustrated a modification in which in addition to the members shown in Figs. 3 and 4, I have shown two collars 98 and 99 each provided with a scale 101 and 102 adapted to be adjusted with reference to a pointer 103 upon the sleeve 32. Where the number of duplicate work members to be provided is too small to justify especially preparing a set of collars 51 and 52 with properly spaced recesses 53 and 54, the scales 101 and 102 enable the feed screw 25 to be repeatedly turned to predetermined positions. The use of the collars 98 and 99 in conjunction with the collars 51 and 52 also facilitate setting of the collars 51 and 52, and enable the accuracy of such setting to be checked upon the scales 101 and 102. I also contemplate as a modification of my apparatus employing a pair of collars with scales marked thereon similar to the collars 98 and 99 of Fig. 12, to be used detachably and interchangeably with a pair of recessed collars 51 and 52 as shown in Figs. 3 and 4 whenever the number of duplicate work members required is relatively small.

The operation, employing my improved stop mechanism, is as follows. Having prepared a master pattern or work member, a pair of stop collars 51 and 52 with stop recesses calculated or measured in the lathe from the master pattern are prepared, and also a longitudinal stop bar with stop notches 74 or 75 and 76 calculated or measured from the master pattern is prepared and mounted upon the bar 68; commencing for instance at one end of the work member, the pawl 37, for instance, is adjusted to active position and the pawl 36 adjusted to inactive position. The tool 27 is adjusted by means of the hand lever 60 toward the work center until the pawl tooth 56 enters a predetermined stop recess 53 of the collar 51, whereupon the longitudinal feed of the tool carriage either by hand or by power is carried out until practically all of the space of uniform diameter has been covered, after which the longitudinal feed is stopped slightly short of the actual or finished shoulder, and the cross-feed screw adjusted until the tooth 53 enters and seats in the second stop recess of the collar 51, whereupon the longitudinal feed of the tool carriage is resumed until the next shoulder of the work member is approached, whereupon the longitudinal feed of the carriage is stopped, and another adjustment of the cross-feed is effected, and so on until all of the sections of the work members have been dressed to dimensions, except as to a finish cut across the respective shoulders which divide the work member into sections. In order to effect the finish cuts of these shoulders, the cross-feed carriage is adjusted to bring the tool 29 into position ready to operate upon the work, then the tool carriage is fed manually longitudinally until the tooth 87 enters one of the stop recesses of the stop bars 74, 75 or 76 as the case may be, so as to cause the tooth 87 when pressed or held down to stop or limit the longitudinal feed of the tool carriage, which brings the tool accurately into position to make a finish cut across one of the shoulders on the work member. The bolt 20 and nut 21 are then employed to clamp the tool carriage rigidly to the lathe bed. The tool 29 is then fed by the cross-feed screw to face the first shoulder. The nut 21 is released and the tooth 87 is then released, and the tool carriage fed longitudinally to a position where the latch tooth 87 engages the next stop notch of the bar 74, 75, or 76, which brings the tool into accurate position to face the next shoulder of the work, and so on until all of the work shoulders have been finished. At each shoulder the tool carriage is clamped by the bolt 20 and nut 21 to the lathe bed, while the cross-feed screw is employed to feed the tool across the face of the shoulder to be faced with a finish cut until the rotation of the cross-feed screw brings the pawl tooth 55 into engagement with an appropriate stop recess 54 of the stop collar 52. If desired a finish longitudinal cut may be taken at the same time that the shoulder is faced, and as a continuation of the same cut, and this would bring the latch tooth 87 into position to engage the next longitudinal stop recess of the stop bar and position the tool carriage ready to face the next work shoulder. The respective cross-feed and longitudinal stop members may be employed in various orders and combinations depending upon the type of work required to be duplicated in quantity. The tooth 87 may be temporarily held down in engagement with its stop notch by a weight on lever 80, or by a suitable latch member as shown in Figs. 7, 9, or 13.

In the modifications shown in Fig. 13, and also in Fig. 9 the shaft 91 is provided with a crank arm 126 which has a cam slot 127. The arm 126 enters a recess 129 in the lower face of the latch bar 80, and the cam slot 127 is engaged by a pin 128 carried by the latch bar 80 and spanning the recess 129. This modification serves to positively feed the latch bar 80 through the rock shaft 91 in either direction up or down.

The apparatus herein shown and described is capable of considerable modification within the scope of the spirit of my invention.

What I claim is:

1. A stop mechanism for machine tools comprising in combination with a machine tool, a main tool carriage, a cross feed tool carriage, stop mechanism to repeatedly stop, the cross-feed tool carriage at predetermined positions relative to the main carriage, a stop bar supporting and carrying member mounted upon and movable with the main tool carriage relative to the machine tool, a plurality of stop bars respectively detachably mounted upon said supporting and carrying member and movable endwise with said main tool carriage, said respective stop bars being provided with a plurality of stop faces faced in one direction, a stop engaging member mounted in fixed position relative to said machine tool, and in position to normally engage the stop faces of one of said stop bars and adjustable selectively into the path of the stop faces of the opposite stop bar, and means operable to successively shift one of said interengaging stop members out of the path of the opposite stop member, 2. A stop mechanism for machine tools comprising in combination with a machine tool, a main tool carriage mounted thereon to move longitudinally, a cross-feed tool carriage mounted to move transversely upon said main tool carriage, a cross-feed screw adapted to feed said cross-feed tool carriage relative to said main tool carriage, a plurality of stop members mounted upon the forward end of said cross feed screw and rotatable with said cross-feed screw, one of said rotatable stop members being provided with a plurality of stop faces faced in one direction and the other of said rotatable stop members being provided with a plurality of stop faces faced in the opposite direction, and a plurality of stop engaging members mounted upon one of said tool carriage carriages and respectively movable into and out of the path of movement of stop faces of said respective rotative stop members to stop the cross-feed of said cross-feed tool repeatedly in either direction at predetermined positions thereof relative to said main tool carriage, means operable to normally hold said non-rotatable stop engaging members in position to engage said rotatable stop members, and means to selectively adjust said non-rotatable stop members to idle position out of the path of said rotatable stop members.

3. A stop mechanism for machine tools comprising in combination with a machine tool, a main tool carriage mounted thereon to move longitudinally, a cross feed tool carriage mounted to move transversely upon said main tool carriage, a cross-feed screw adapted to feed said cross feed tool carriage relative to said main tool carriage, a collar mounted said cross feed screw to rotate therewith and provided with a plurality of stop faces faced in one direction and located at the periphery of said stop collar, and a stop engaging member mounted upon one of said tool carriages and movable radially of said stop collar into and out of engagement with successive stop faces of said stop collar to repeatedly stop said cross feed tool carriage at predetermined positions relative to said main tool carriage.

4. A stop mechanism for machine tools comprising in combination with a machine tool, a main tool carriage mounted thereon to move longitudinally, a cross feed tool carriage mounted to move transversely upon said main tool carriage, a cross-feed screw adapted to feed said cross feed tool carriage relative to said main tool carriage, a pair of collars mounted upon said cross feed screw to rotate therewith, one of said collars being provided with a plurality of stop faces faced in one direction and located at the periphery of said stop collar and the other stop collar provided with a plurality of stop faces faced in a reverse direction and located at the periphery of said stop collar, and independent stop engaging members mounted upon one of said tool carriages and independently movable radially of said stop collars into and out of engagement with successive stop faces of said respective stop collars to repeatedly stop said cross feed tool carriage at predetermined positions relative to said main tool carriage.

5. A stop mechanism for machine tools comprising in combination with a machine tool, a main tool carriage mounted thereon to move longitudinally, a cross-feed tool carriage mounted to move transversely upon said main tool carriage, a cross-feed screw adapted to feed said cross feed tool carriage relative to the main tool carriage, a stop member mounted upon the forward end of said cross-feed screw and rotatable with said cross-feed screw, said stop member being provided with a plurality of stop faces faced in one direction, a stop engaging member mounted upon one of said tool carriages in position to interengage successively with said rotatable stop faces of said rotatable stop member and permit said stop faces to pass said stop engaging member when said stop engaging member is moved out of the path of said rotatable stop faces, and stop mechanism operable in connection with said cross-feed stop mechanism to stop said main tool carriage at a plurality of predetermined positions along the ways in position for successive stops on said rotatable stop members to be engaged by said stop engaging member.

6. A stop mechanism for machine tools comprising in combination with a machine tool, a main tool carriage mounted thereon to move longitudinally, a cross-feed tool carriage mounted to move transversely upon said main tool carriage, a cross-feed screw adapted to feed said cross feed tool carriage relative to the main tool carriage, a stop member mounted upon the forward end of said cross-feed screw and rotatable with said cross-feed screw, said stop member being provided with a plurality of stop faces faced in one direction, a stop engaging member mounted upon one of said tool carriages in position to interengage successively with said rotatable stop faces of said rotatable stop member and permit said stop faces to pass said stop engaging member when said stop engaging member is moved out of the path of said rotatable stop faces, and stop mechanism operable in connection with said cross-feed stop mechanism to stop said main tool carriage at a plurality of predetermined positions along the ways in position for successive stops on said rotatable stop members to be engaged by said stop engaging member.

7. A stop mechanism for machine tools comprising in combination with a machine tool a main tool carriage mounted thereon to move longitudinally, a cross feed tool carriage mounted to move transversely upon said main tool carriage, a cross feed screw adapted to feed said cross feed tool carriage relative to said main tool carriage, a sleeve in which said cross feed screw is journaled and held against movement endwise thereof adapted to be stationarily mounted upon said cross feed carriage, a collar mounted upon said cross feed screw outside of said sleeve and provided with a plurality of stop faces all faced in one direction and adapted to be successively employed to stop the cross feed of said cross feed carriage at different positions of the main tool carriage longitudinally of the machine tool, a stop member mounted upon said collar and riding upon the periphery of said stop collar and movable radially of said stop collar to successively stop the cross feed at different positions of the tool carriages longitudinally of the machine tool.

8. A stop mechanism for machine tools comprising in combination with a machine tool a main tool carriage mounted thereon to move longitudinally, a cross feed tool carriage mounted to move transversely upon said main tool carriage, a cross feed screw adapted to feed said cross feed tool carriage relative to said main tool carriage, a sleeve in which said cross feed screw is journaled and held against movement endwise thereof adapted to be stationarily mounted upon said cross feed carriage, a collar mounted upon said cross feed screw outside of said sleeve and provided with a plurality of stop faces all faced in one direction and adapted to be successively employed to stop the cross feed of said cross feed carriage at different positions of the main tool carriage longitudinally of the machine tool, a stop member mounted upon said sleeve and riding upon the periphery of said stop collar and movable radially of said stop collar to successively stop the cross feed at different positions of the tool carriage longitudinally of the machine tool, a second collar mounted upon said cross feed screw outside of said sleeve and provided with a plurality of stop faces all faced in one direction and in the opposite direction to that of the stops of said first collar, a second stop member mounted upon said sleeve and riding upon the periphery of said second stop collar and movable radially of said stop collar to successively stop the cross feed at a different series of positions of the tool carriage longitudinally of the machine tool.

In testimony whereof I have affixed my signature.

WILLIAM SCHRODER.